United States Patent [19]
Wood et al.

[11] Patent Number: 5,343,777
[45] Date of Patent: Sep. 6, 1994

[54] ECCENTRIC CRANK ASSEMBLY FOR A RECIPROCATING PISTON AIR COMPRESSOR

[75] Inventors: Mark W. Wood; Brian M. Steurer, both of Jackson, Tenn.

[73] Assignee: DeVilbiss Air Power Company, Jackson, Tenn.

[21] Appl. No.: 862,331

[22] Filed: Apr. 2, 1992

[51] Int. Cl.⁵ .................... F16C 3/04; F16B 2/02
[52] U.S. Cl. .................... 74/598; 74/595; 403/314; 403/370; 403/341
[58] Field of Search .............. 74/44, 122, 125, 570, 74/595; 403/314, 341, 368, 370, 374

[56] References Cited

U.S. PATENT DOCUMENTS

| | | | |
|---|---|---|---|
| 687,864 | 12/1901 | Smyth | 403/314 X |
| 867,312 | 10/1907 | Shutz | 403/341 |
| 1,984,454 | 12/1934 | Belyavin | 74/598 |
| 3,434,303 | 3/1969 | Leyer | 403/314 X |
| 4,304,502 | 12/1981 | Stratienko | 403/370 |
| 4,351,201 | 9/1982 | Link | 74/598 |
| 4,464,076 | 8/1984 | Leibhard | 403/370 X |
| 4,493,226 | 1/1985 | Andrione et al. | 74/598 |
| 4,546,670 | 10/1985 | Gaspardo | 74/595 |
| 4,559,686 | 12/1985 | Kessler | 29/156.5 R |
| 4,648,806 | 3/1987 | Alexander | 417/238 |
| 4,800,536 | 1/1989 | Dittrich | 403/341 X |
| 4,813,296 | 3/1989 | Guinn | 74/595 |
| 4,906,124 | 3/1990 | Hogue | 403/370 X |
| 4,915,594 | 4/1990 | Lammers | 417/265 |
| 4,944,699 | 7/1990 | Velke, Sr. et al. | 403/314 X |

FOREIGN PATENT DOCUMENTS

| | | | |
|---|---|---|---|
| 452364 | 11/1927 | Fed. Rep. of Germany | 403/314 |
| 683146 | 2/1930 | France | 403/341 |
| 1502148 | 10/1967 | France | 403/341 |

Primary Examiner—Vinh T. Luong
Attorney, Agent, or Firm—MacMillan, Sobanski & Todd

[57] ABSTRACT

This invention is directed to an improved eccentric crank assembly for a reciprocating piston type air compressor. The eccentric crank assembly includes an eccentric plate, a compressor shaft, and an eccentric shaft. The eccentric plate is provided with a pair of parallel overlapping openings formed therethrough. The compressor shaft includes one end provided with a flat angled surface, and the eccentric shaft includes one end provided with a corresponding flat angled surface. The angled surface ends of the shafts are disposed within the openings of the plate. When the eccentric shaft is moved away from the compressor shaft, the angled flat surfaces force the shafts radially apart and into engagement with the openings of the eccentric plate, thereby locking the shafts and the eccentric plate together.

7 Claims, 1 Drawing Sheet

ECCENTRIC CRANK ASSEMBLY FOR A RECIPROCATING PISTON AIR COMPRESSOR

TECHNICAL FIELD

This invention relates in general to reciprocating piston type air compressors and in particular to an improved eccentric crank assembly for coupling a main compressor shaft to an eccentric shaft to drive a piston of such an air compressor.

BACKGROUND ART

Portable and stationary reciprocating piston type air compressors are used for many applications, including operating spray guns, air brushes, pneumatic tools, tire inflaters, and the like. In this type of air compressor, a piston is mounted to reciprocate within a cylinder. Typically, the piston is coupled to a motor of the air compressor through an eccentrically rotated crank assembly.

In one type of crank assembly, an eccentric plate is provided with a pair of parallel spaced apart openings formed therethrough. The openings receive ends of a main compressor drive shaft and an eccentric shaft to connect the two shafts together in parallel relationship to one another. Or, the plate can be provided with a single opening formed therein. In this crank assembly, the compressor shaft is usually disposed in the single opening and the eccentric shaft is secured to the plate, such as, for example, by welding. In either type, the compressor drive shaft is in turn coupled to a motor, and the eccentric shaft is coupled through a connecting rod to the piston. In the third design, the eccentric plate and eccentric shaft are cast together. The drive shaft may be secured to the eccentric plate or also may be cast integrally with the eccentric plate. During operation the compressor drive shaft rotates the plate causing the eccentric shaft to be rotated along therewith. As a result, the connecting rod reciprocates the piston within the cylinder.

In the first type of crank assembly, the openings provided in the eccentric plate must be precisely formed to position the two shafts in parallel relationship to one another. This requires that the diameters of the openings and the ends of the two shafts be machined to close tolerances so that no radial movement of the shafts occurs. If radial movement occurs, the two shafts are no longer maintained in an aligned parallel relationship, and undue vibration, noise, and premature component wear will occur during operation of the air compressor. However, it is difficult to consistently maintain tolerances and considerable time and expense are incurred to machine these components.

In the second type of crank assembly, the eccentric shaft must be secured to the eccentric plate so that it is parallel to the opening for the compressor shaft. This requires that the eccentric shaft be carefully positioned on the plate, and, while in this position, that the shaft be secured thereto without movement. Any movement of the eccentric shaft from the desired position on the plate can result in the two shafts not being in parallel alignment with respect to each other. In addition, the point of attachment of the eccentric shaft to the plate must be sufficiently strong so as to prevent failure at this point during operation of the compressor. Furthermore, the diameters of the opening and the compressor shaft must be precisely machined to close tolerances.

SUMMARY OF THE INVENTION

The invention is directed to a reciprocating-piston type air compressor including an improved eccentric crank assembly for coupling a compressor drive shaft to an eccentric shaft to reciprocate a piston of the air compressor. The crank assembly includes an eccentric plate provided with a pair of parallel overlapping openings formed therethrough. The openings are formed having at least one of the diameters slightly larger than those of the main compressor shaft and/or the eccentric shaft so as to limit the radial movement of the shafts and maintain parallelism between the shafts when they are installed therein. The eccentric plate may be formed by drilling and machining the shaft openings or it may be formed to high precision using low cost powdered metal technology.

The compressor drive shaft includes one end disposed in one of the openings of the plate. The compressor shaft either may be a motor shaft or it may be coupled to be rotated by a motor. The end of the compressor shaft disposed in the plate is provided with a generally axially extending angled flat surface which angles away from the shaft end. The eccentric shaft includes one end disposed in the other opening of the plate and an opposite threaded end. The end of the eccentric shaft disposed in the plate is provided with a generally axially extending angled flat surface which generally corresponds to the shape and angle of the angled flat surface of the compressor shaft and is angled away from the adjacent shaft end. A threaded nut is received on the threaded end of the eccentric shaft. When the nut is rotated onto the shaft end, the eccentric shaft is pulled away from the compressor shaft and the angled flat surfaces force the shafts radially apart to lock the shafts to the plate in parallel relationship to one another. In addition, one of the angled flat surfaces may be bifurcated to define a slight apex between the two angled flat surfaces. The apex is formed at a predetermined location on the shaft such that when the eccentric shaft is moved away from the compressor shaft, the point of engagement between the two shafts is substantially in the center of the eccentric plate.

It is an object of the invention to provide an improved eccentric crank assembly for a reciprocating-piston type air compressor and similar machines which is simple and inexpensive in construction and operation.

Other objects and advantages of the invention will become apparent to those skilled in the art from reading the following detailed description of a preferred embodiment.

BEST MODE FOR CARRYING OUT THE INVENTION

Figure 1:
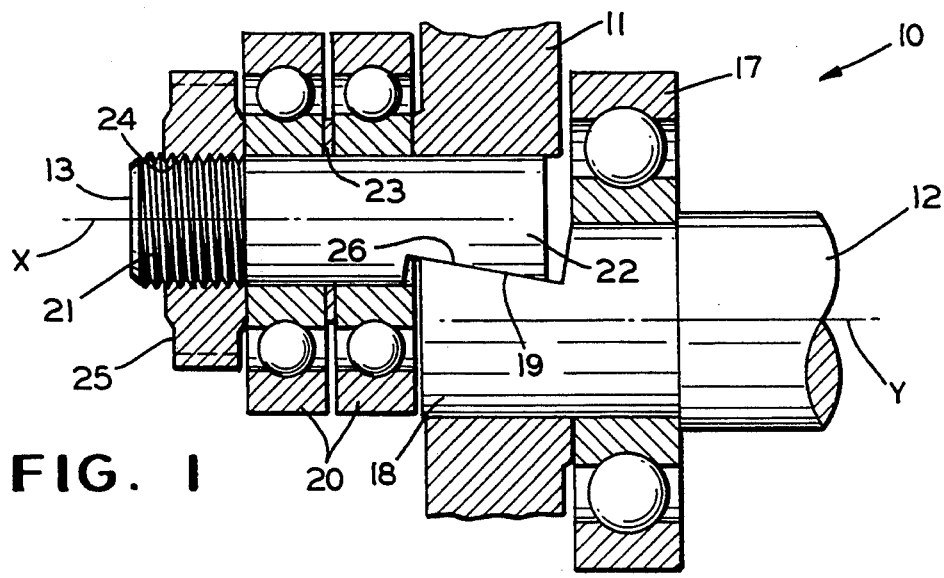
FIG. 1 is a cross-sectional view of an improved eccentric crank assembly for use in a reciprocating-piston type air compressor and constructed in accordance with a first embodiment of the present invention.

Referring to FIG. 1 of the drawings, an improved eccentric crank assembly 10 for use in a reciprocating-piston type air compressor or other reciprocating piston machines is illustrated in accordance with a first embodiment of the present invention. The general structure and operation of this type of air compressor are well known.

Figure 2:
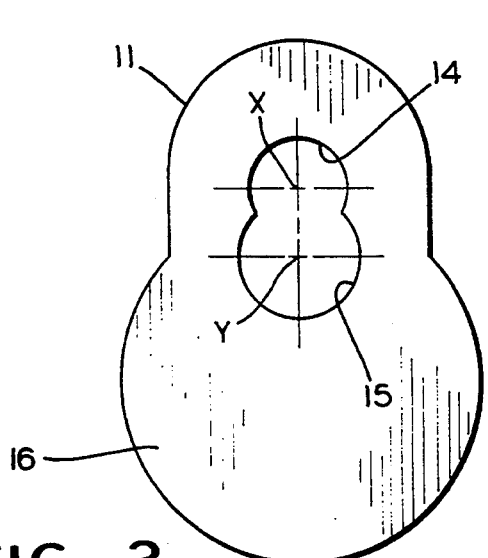
FIG. 2 is a front plan view of a plate of the eccentric crank assembly shown in FIG. 1.

The improved eccentric crank assembly 10 includes an eccentric plate 11, a main compressor drive shaft 12, and an eccentric shaft 13. The eccentric plate 11, best shown in FIG. 2, is provided with a pair of precision formed parallel overlapping openings 14 and 15 formed therethrough. The opening 15 receives the drive shaft 12 and the opening 14 receives the eccentric shaft 13. The opening 14 has an axis X for the eccentric shaft 13 and the opening 15 has an axis Y for the drive shaft 12. At least one of the openings 14 or 15 is formed having a diameter which is slightly larger than the diameter of the eccentric shaft 13 or the drive shaft 12, respectively. As a result, radial movement of the shafts is limited and parallelism is maintained between the shafts when the eccentric shaft 13 is moved axially relative to the drive shaft 12. The eccentric plate 11 may include a bottom portion 16 which is formed having a predetermined configuration so as to provide counterbalancing to the weight of the piston when the plate 11 is rotated.

The drive shaft 12 is journalled in a bearing 17 and includes an inner end (not shown) and an outer end 18. The drive shaft 12 has a small step or diameter reduction at the bearing 17 to prevent the shaft 12 from being pulled through the bearing 17. The inner end of the drive shaft 12 is coupled to an output shaft (not shown) of a motor or the drive shaft 12 may be the motor shaft. The outer end 18 is disposed in the opening 15 of the eccentric plate 11. The outer shaft end 18 is provided with a portion having an angled flat surface 19 formed therein. The angled flat surface 19 extends axially inwardly toward the opposite end of the drive shaft 12 and defines a ramped surface thereon.

The eccentric shaft 13 mounts one or more bearings 20 (two shown) and includes an outer end 21 and an inner end 22. An annular spacer 23 may be disposed on the eccentric shaft 13 between the bearings 20. The bearings 20 mount a connecting rod (not shown) which is attached to a piston (not shown) which reciprocates in a cylinder (not shown) of the air compressor. The outer end 21 of the eccentric shaft 13 is provided with threads 24 to receive a threaded nut 25.

The inner end 22 of the eccentric shaft 13 is disposed in the opening 14 of the eccentric plate 11. The inner end 22 is provided with a portion having an angled flat surface 26. The angled flat surface 26 extends axially inwardly toward the outer end 21 of the eccentric shaft 13 and defines a ramped surface thereon. The angled flat surface 26 of the eccentric shaft 13 generally corresponds to the shape and angle of the angled flat surface 19 of the drive shaft 12. As a result, when the eccentric shaft 13 is moved axially away from the drive shaft 12, the ramped surfaces 19 and 26 cooperate to move the two shafts 12 and 13 radially away from one another and into locking engagement with the openings 15 and 14, respectively, of the eccentric plate 11.

In order to lock the drive shaft 12 and the eccentric shaft 13 to the eccentric plate 11, the threaded nut 25 is rotated by a suitable tool, for example, a wrench, to move the nut 25 axially on the eccentric shaft 13 toward the eccentric plate 11. This clamps the bearings 20, the spacer 23, and the eccentric plate 11 together and causes the eccentric shaft 13 to move axially away from the drive shaft end 18, i.e., to the left in FIG. 1. In turn, as the eccentric shaft 13 moves axially away from the drive shaft end 18, the ramped surfaces 26 and 19 of the eccentric shaft 13 and the drive shaft 12, respectively, engage and force the shafts radially away from one another. Thus, the parallel shaft axes X and Y are forced apart. By forcing the drive shaft 12 and the eccentric shaft 13 radially outwardly in this manner, the shafts 12 and 13 are forced into locking engagement with the openings 15 and 14 of the eccentric plate 11 while remaining in precise parallel relationship to one another. Thus, when the compressor drive shaft 12 is rotated, the eccentric shaft 13 will eccentrically rotate along with the drive shaft 12 and, therefore, the connecting rod will reciprocate the piston within the cylinder of the air compressor.

It should be noted that only one of the eccentric plate openings 14 or 15 need to be larger than the shaft mounted therein in order to assemble the crank assembly 10. For example, the opening 15 may be sized to just receive the drive shaft 12 and the opening 14 may be slightly larger than the eccentric shaft 13. When the eccentric shaft 13 is moved away from the drive shaft end 18, only the axis X of the eccentric shaft 13 will be displaced to lock the assembly 10 together.

Figure 3:
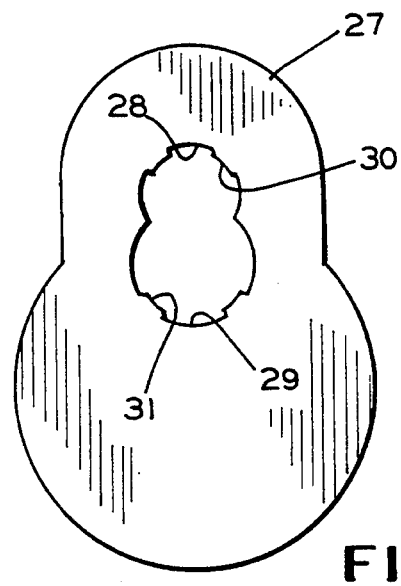
FIG. 3 is a front plan view similar to FIG. 2 and showing an alternate embodiment of the plate.

Turning now to FIG. 3, an alternate embodiment of an eccentric plate 27 for use in the crank assembly 10 is illustrated. As shown therein, the eccentric plate 27 is substantially identical to the eccentric plate 11 illustrated in FIG. 1, except that the precision formed parallel openings 28 and 29 formed therethrough are provided with a plurality of inwardly curved tangs 30 and 31, respectively, on the inner surfaces thereof. These inwardly curved tangs 30 and 31 further limit the radial movement between the shafts 13 and 12 to ensure that the shafts are maintained in precise parallel relationship when the eccentric shaft 13 is moved away from the compressor shaft 12.

In the embodiment of FIG. 2, the opening 14 must have a diameter slightly larger than the diameter of the eccentric shaft 13 to facilitate assembly. Consequently, the eccentric shaft 13 may be able to move slightly in the opening 14, even though it is being forced away from the drive shaft 12 because of the small contact area between the eccentric shaft 13 and the side of the opening 14. In the embodiment of FIG. 3, the eccentric shaft 13 will be forced into contact with the spaced tangs 30 and the drive shaft 12 will be forced into contact with the spaced tangs 31 to enhance stability of the shafts 12 and 13.

Figure 4:
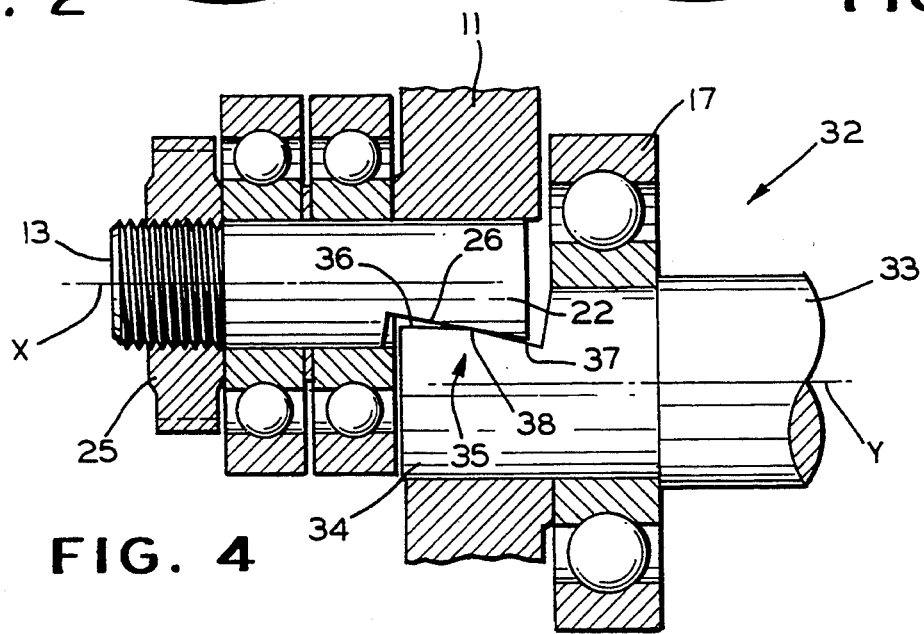
FIG. 4 is a cross-sectional view similar to FIG. 1 and showing a modified eccentric crank assembly constructed in accordance with a second embodiment of the present invention.

Turning now to FIG. 4, a second embodiment of the present invention is illustrated. As shown therein, an improved crank assembly 32 is substantially identical to the crank assembly 10 illustrated in FIG. 1, except that a compressor drive shaft 33 includes an outer end 34 provided with a bifurcated or double angled flat surface 35. The bifurcated flat surface 35 includes a first flat portion 36, a second flat portion 37, and an apex 38 defined therebetween. The apex 38 may be formed as a straight line perpendicular to the axis Y as shown, or may be slightly rounded.

In this embodiment, when the nut 25 is tightened, the eccentric shaft 13 moves axially away from the drive shaft 33 and the ramped surface 26 engages the apex 38 and forces the shafts 13 and 33 radially apart at this point and into locking engagement with the openings 14 and 15 of the eccentric plate 11. Furthermore, the apex 38 is formed on the surface 35 of the drive shaft 33 at a predetermined location so that the shafts 13 and 33 engage and force each other radially apart at a location which is approximately in the center of the eccentric plate 11. By forming the apex 38 at this predetermined location on the drive shaft 33, the shafts 13 and 33 engage each other within the eccentric plate 11 at the center thereof. The centered force on the shafts 13 and 33 presses the shafts 13 and 33 tighter against the walls of the openings 14 and 15 (or 28 and 29) to increase the strength of the joints between the shafts 13 and 33 and the eccentric plate 11.

The angle separating the first portion 36 and the second portion 37 is shown in the FIG. 4 exaggerated for clarity purposes. It has been found that the angle between the first portion 36 and the second portion 37 can be relatively small, for example, approximately 2°, and still provide the desired operating result. Furthermore, it must be appreciated that while the invention has been illustrated and described as forming the bifurcated angled flat surface 35 in the outer end 34 of the drive shaft 33, this bifurcated angled flat surface could be formed instead on the inner end 22 of the eccentric shaft 13 and function in a similar manner.

Thus, this invention provides a pair of parallel overlapping openings formed in the eccentric plate which cooperate with angled surfaces provided on the shafts to maintain the shafts in parallel relationship to one another and lock the shafts to the plate when the eccentric shaft is moved away from the drive shaft. As a result, this invention eliminates the need to machine the diameters of the shafts to high tolerances required by the prior art. In addition, when one of the two shafts is provided with a bifurcated flat surface, the apex defined thereon ensures that the shafts engage the eccentric plate at the center thereof, thereby providing maximum joint strength at the point of connection.

Also, the eccentric plate of this invention is preferably manufactured from powdered metal. This allows the parallel overlapping openings formed therethrough to be precisely formed without the need for machining, which is required to form the openings in the prior art eccentric plate. As a result, the cost to manufacture the eccentric plate of this invention is reduced by as much as 150% when compared to the cost to manufacture the prior art plate. It should be appreciated that in its broadest aspects, the invention may be incorporated into apparatus other than air compressors. For example, the eccentric crank assembly 10 or 32 may be used for a crankshaft on a small reciprocating piston internal combustion engine.

In accordance with the provisions of the patent statutes, the principle and mode of operation of the invention have been described and illustrated in its preferred embodiment. However, it must be understood that the invention may be practiced otherwise than as specifically explained and illustrated without departing from its scope or spirit.

We claim:

1. An eccentric crank assembly for a reciprocating-piston device comprising:
    an eccentric plate having a pair of parallel overlapping openings formed therethrough;
    a drive shaft having one end disposed in one of said openings of said eccentric plate, said one end of said drive shaft including a generally flat surface angled inwardly toward an opposite end thereof;
    an eccentric shaft having one end disposed in the other of said openings of said eccentric plate, said one end of said eccentric shaft including a generally flat surface angled inwardly toward an opposite end thereof; and
    means causing said generally flat surface of said drive shaft and said generally flat surface of said eccentric shaft to cooperate with one another to urge said drive shaft and said eccentric shaft radially away from one another and into engagement with said openings of said eccentric plate, thereby connecting said eccentric plate, said drive shaft, and said eccentric shaft together.

2. An eccentric crank assembly as defined in claim 1, wherein said means causing said generally flat surfaces to cooperate includes threads provided on said opposite end of said eccentric shaft and a threaded nut secured thereon, said threaded nut adapted to be rotated in a direction causing of said drive shaft whereby said angled generally flat said eccentric shaft to move axially away from said one end surfaces urge said drive shaft and said eccentric shaft radially apart and into engagement with said openings of said eccentric plate.

3. An eccentric crank assembly as defined in claim 1, and further including means provided on one of said generally flat surfaces for connecting said shafts and said eccentric plate together in a generally centered position within said eccentric plate.

4. An eccentric crank assembly as defined in claim 1, wherein said generally flat surface on said one end of said drive shaft is bifurcated to form a double angled flat surface thereon having an apex defined between the two angled flat surfaces to extend perpendicular to the axis of said drive shaft and having a location which is in a generally centered position within said eccentric plate and wherein said apex contacts said generally flat surface on said eccentric shaft.

5. An eccentric crank assembly as defined in claim 1, wherein said generally flat surface on said one end of said eccentric shaft is bifurcated to form a double angled flat surface thereon having an apex defined between the two angled flat surfaces to extend perpendicular to the axis of said eccentric shaft and having a location which is in a generally centered position within said eccentric plate and wherein said apex contacts said generally flat surface on said drive shaft.

6. An eccentric crank assembly for a reciprocating-piston device comprising:
    an eccentric plate having a pair of parallel. overlapping openings formed therethrough;
    a drive shaft having one end disposed in one of said openings of said eccentric plate;
    an eccentric shaft having one end disposed in the other of said openings of said eccentric plate;
    at least one of said openings in said eccentric plate defining at least two spaced apart tangs extending parallel to the axis of such opening; and means for urging said drive shaft and said eccentric shaft radially away from one another and into engagement with said openings of said eccentric plate, thereby connecting said eccentric plate, said drive shaft, and said eccentric shaft together; and wherein the shaft in said at least one opening is urged into contact with the tangs in such opening to orient such shaft parallel to the axis of such opening.

7. An eccentric crank assembly as defined in claim 6, wherein each of said openings in said eccentric plate is provided with at least two spaced apart tangs extending parallel to the axes of said openings.

* * * * *

UNITED STATES PATENT AND TRADEMARK OFFICE
CERTIFICATE OF CORRECTION

PATENT NO. : 5,343,777

DATED : September 6, 1994

INVENTOR(S) : Mark W. Wood and Brian M. Steurer

It is certified that error appears in the above-identified patent and that said Letters Patent is hereby corrected as shown below:

Claim 2, Column 6, lines 18 and 19, delete "of said drive shaft whereby said angled generally flat", and line 20, after "end" insert -- of said drive shaft whereby said angled generally flat --.

Signed and Sealed this

First Day of November, 1994

*Attest:*

BRUCE LEHMAN

*Attesting Officer*     *Commissioner of Patents and Trademarks*